US007026373B2

(12) United States Patent
Smith et al.

(10) Patent No.: US 7,026,373 B2
(45) Date of Patent: Apr. 11, 2006

(54) POLYAMPHOTERIC SUPERABSORBENT COPOLYMERS

(75) Inventors: Scott J. Smith, Greensboro, NC (US); Seungkoo Kang, Chapel Hill, NC (US)

(73) Assignee: Stockhausen GmbH, Krefeld (DE)

( * ) Notice: Subject to any disclaimer, the term of this patent is extended or adjusted under 35 U.S.C. 154(b) by 52 days.

(21) Appl. No.: 10/141,673

(22) Filed: May 6, 2002

(65) Prior Publication Data

US 2003/0207958 A1 Nov. 6, 2003

(51) Int. Cl.

| | |
|---|---|
| ***C08F 2/46*** | (2006.01) |
| ***C08F 120/06*** | (2006.01) |
| ***C08F 20/06*** | (2006.01) |
| ***C08F 220/06*** | (2006.01) |
| ***C08J 3/28*** | (2006.01) |

(52) U.S. Cl. ........................ 522/182; 522/178; 522/71; 522/90; 522/150; 522/152; 427/508; 427/487; 427/518; 428/378; 428/380; 428/383; 428/441; 428/500; 526/317.1; 526/318; 526/318.2; 526/319; 526/320; 526/930

(58) Field of Classification Search .................. 522/86, 522/150, 152, 173, 175, 178, 182, 39, 50, 522/63, 65, 90, 96, 71; 428/441, 442, 476.3, 428/483, 507, 511, 516, 411.1, 426, 412, 428/422.8, 423.1, 343, 345, 355, 355 N, 428/500, 378, 380, 383; 525/903, 919; 526/930, 526/317.1, 318, 318.2; 427/508, 514, 516, 427/517, 520, 207.1, 208, 208.8, 518, 487
See application file for complete search history.

(56) References Cited

U.S. PATENT DOCUMENTS

| | | | | |
|---|---|---|---|---|
| 5,229,466 | A | 7/1993 | Brehm et al. | |
| 5,408,019 | A | 4/1995 | Mertens et al. | |
| 5,610,220 | A | 3/1997 | Klimmek et al. | |
| 5,756,159 | A | 5/1998 | Hoskins et al. | |
| 6,060,557 | A | 5/2000 | Dahmen et al. | |
| 6,103,317 | A | 8/2000 | Asai et al. | |
| 6,208,790 | B1 | 3/2001 | Zopf et al. | |
| 6,565,981 | B1 * | 5/2003 | Messner et al. | 428/441 |

FOREIGN PATENT DOCUMENTS

WO WO 01/94433 A1 12/2001

OTHER PUBLICATIONS

Principles of Polymerization. George Odian. copyright 1970. p. 97.*

* cited by examiner

*Primary Examiner*—Sanza L. McClendon
(74) *Attorney, Agent, or Firm*—Smith Moore LLP

(57) ABSTRACT

A polyamphoteric superabsorbent copolymer made up of polymerizerable acid monomer and of polymerizable base monomer and optionally a supplemental monomer. In particular, the invention includes a radiation curable coating composition that comprises from about 20 weight % to about 80 weight % of polymerizerable acid monomer and from about 20 weight % to about 80 weight of polymerizable base monomer; and from 0 weight % to about 50 weight % of supplemental monomer. On exposure to radiation the coating composition forms a polyamphoteric superabsorbent copolymer. The radiation curable coating composition may be used with suitable substrates.

29 Claims, No Drawings

POLYAMPHOTERIC SUPERABSORBENT COPOLYMERS

TECHNICAL FIELD

The present invention relates, in general, to polyamphoteric superabsorbent copolymers and their use in coating compositions and substrates to block water migration in applications such as cable, tape and other applications. The polyamphoteric superabsorbent copolymers and the coating compositions containing the copolymers are capable of fluid retention. More particularly, the present invention relates to a coating composition made up of a solution of acid and base monomers that is converted to polyamphoteric superabsorbent copolymer upon radiation of the coating. Such coating compositions are used in water-blocking composites in such applications as cables, in packaging, in labels, in construction, in personal hygiene articles, in films and in other applications.

DEFINITIONS OF ABBREVIATIONS

| Abbreviations | Definitions |
|---|---|
| X-linking | cross-linking |
| SAP | superabsorbent polymer, a polymer that absorbs over 10 times its weight in water |
| polyamphoteric polymer | Polymer that contains both acidic and basic groups in the same polymer chain |
| CRC | centrifuge retention capacity |
| g | gram |
| DMAEA | dimethylaminoethyl acrylate |
| DMAEM | dimethylaminoethyl methacrylate |
| DEAEM | diethylaminoethyl methacrylate |
| DEAEA | diethylaminoethyl acrylate |
| BISOMER MPEG350MA | methoxypolyethyleneglycol 350 methacrylate |
| SARTOMER 454 | ethoxylated (3) trimethylolpropane triacrylate |
| PAA | polyacrylic acid |
| Base monomer | Monomer capable of accepting a proton or acting as a base |
| Acid monomer | Monomer capable of donating a proton or acting as an acid. |

BACKGROUND OF THE INVENTION

A substantial and persistent problem in the cable industry is the ingress or migration of moisture and water into a cable sheath system or structure. Such ingress often results from damage in the sheath of the cable or changes in ambient conditions which cause differences in vapor pressure between the inside and the outside of a cable jacket. Consequently, moisture tends to diffuse in a unidirectional manner from the outside of the cable to the inside of the cable. This results in an undesirably high moisture level inside the cable. High levels of condensed moisture inside a cable sheath system may have a detrimental effect on the transmission characteristics of a metallic conductor cable.

This invention relates to water swellable materials and radiation cure processes for their preparation. In particular, it is concerned with the use of such materials and processes for the preparation of water absorbent or water blocking coatings. A particular application for such materials and processes is in cables to apply water absorbent or blocking coatings to cable components (wires, rods, tubes, strength members, reinforcements etc.) in order to block water migration along the cables. Other applications requiring water blocking or absorption can also be amenable to this technology.

Many types of water absorbent or water swellable polymers are known (J. Macromol. Sci. Rev. Macromol. Chem. Phys. C34(4) 1994 pp 607–662). Commercial ‘superabsorbent polymers’, generally referred to as SAPs, are available and they have the ability to absorb water or aqueous salt solutions, often in an amount several times their own weight. They are commonly supplied as powders, or as fibers or films. The most common form is powder, which is usually incompressible and infusible and so are not ideally suited to application as a direct coating.

General background of the manufacture of superabsorbent polymers can be seen in the journal article, “Keeping Dry with Superabsorbent Polymers”, Chemtech, (September 1994) by Buchholz. This article contains an excellent discussion of the conventional methods for making superabsorbent polymers. Also mentioned are various uses of superabsorbent polymers such as in disposable diapers, in a sealing composite between concrete blocks that make up the wall of underwater tunnels, and in tapes for water blocking in fiber optic cables and power transmission cables.

More general background with respect to various superabsorbent polymers and their methods of manufacture can be seen in U.S. Pat. No. 5,229,466 (issued Jul. 20, 1993) to Brehm and Mertens; U.S. Pat. No. 5,408,019 (issued Apr. 18, 1995) to Mertens, Dahmen and Brehm; and U.S. Pat. No. 5,610,220 (issued Mar. 11, 1997) to Klimmek and Brehm, all of which patents are assigned to Chemische Fabrik Stockhausen GmbH.

The use of SAPs in the cable industry is found in various publications. U.S. Pat. No. 6,103,317 discloses a water blocking composite made up of a coating of a radiation polymerized compound and a water swellable compound such as SAP wherein the 2 compounds are mixed and cured. The SAP used in the ’317 is a heterogeneous system made up of a precured SAP that is coated onto a matrix that holds the SAP. As a result the SAP is not uniformly applied to the substrate. Furthermore the SAP is not a polyamphoteric polymer.

The disclosures of all the above-mentioned patents and published patent applications are incorporated by reference.

SUMMARY OF OBJECTS OF THE INVENTION

A need exists for a material having enhanced absorbency and a method to make such a material.

The present invention is a polyamphoteric superabsorbent copolymer made up of from about 20 weight % to 80 weight % of polymerizerable acid monomer and from about 20 weight % to 80 weight % of a polymerizable base monomer and, from 0 weight % to about 50 weight % supplemental comonomer.

In addition the present invention includes a radiation curable coating composition made up of from about 20 weight % to 80 weight % of polymerizerable acid monomer and from about 20 weight % to about 80 weight of a polymerizable base monomer; and from 0 weight % to about 50 weight % of other supplemental comonomer; and a cross linking agent; a photoinitiator; and, optionally, functional additives, that on exposure to radiation forms a polyamphoteric superabsorbent copolymer.

The present invention also includes a composite material comprising a substrate material and a cured coating composition made up of from about 20 weight % to 80 weight % of polymerizerable acid monomer and from about 20 weight % to about 80 weight % of polymerizable base monomer; and from 0 weight % to about 50 weight % of supplemental comonomer; and a cross linking agent; and a photoinitiator; and, optionally, functional additives.

The present invention also includes a method for making a radiation curable coating composition, said method including the steps of forming a monomer solution of from about 20 weight % to about 80 weight % of polymerizerable acid monomer and from about 20 weight % to about 80 weight of polymerizable base monomer and from 0 weight % to about 50 weight % of supplemental comonomer and a cross linking agent and a photoinitiator and optionally additives to improve film properties. After coating, the monomer solution is subjected to a radiation source for sufficient time to make the polyamphoteric polymer.

DETAILED DESCRIPTION OF THE INVENTION

The present invention provides a polyamphoteric superabsorbent copolymer made from a coating composition comprising from about 20 weight % to about 80 weight % of polymerizerable acid monomer; and from about 20 weight % to about 80 weight of a polymerizable base monomer and from 0 weight % to about 50 weight % of supplemental comonomer. Preferably, polymerizerable acid monomers are selected from the group consisting of olefinically unsaturated carboxylic, phosphonic and sulfonic acid compounds and are present in the amount of preferably from about 25 weight %, more preferably, from about 30 weight % to about 80 weight %. Preferred monoethylenically unsaturated, acid-group containing monomers are acrylic acid, methacrylic acid, ethacrylic acid, α-chloroacrylic acid, α-cyanoacrylic acid, β-methacrylic acid (crotonic acid), α-phenylacrylic acid, β-acryloxypropionic acid, sorbic acid, α-chlorosorbic acid, 2'-methylisocrotonic acid, cinnamic acid, p-chloro-cinnamic acid, β-stearyl acid, itaconic acid, citraconic acid, mesaconic acid, glutaconic acid, aconitic acid, maleic acid, fumaric acid, tricarboxyethylene and maleic anhydride, acrylic acid as well as methacrylic acid being particularly preferred.

In addition to these carboxylate group-containing monomers, ethylenically unsaturated sulfonic acid monomers or ethylenically unsaturated phosphonic acid monomers are moreover preferred as monoethylenically unsaturated, acid group-containing monomers.

As ethylenically unsaturated sulfonic acid monomers, allylsulfonic acid or aliphatic or aromatic vinylsulfonic acids or acrylic or methacrylic sulfonic acids are preferred. As aliphatic or aromatic vinylsulfonic acids, vinylsulfonic acid, 4-vinylbenzylsulfonic acid, vinyl-toluenesulfonic acid and styrenesulfonic acid are preferred. As acrylsulfonic acids or methacrylsulfonic acids, sulfoethyl (meth)acrylate, sulfopropyl (meth)-acrylate and 2-hydroxy-3-methacryloxypropylsulfonic acid are preferred. As meth)acrylamidoalkylsulfonic acid, 2-acrylamido-2-methylpropanesulfonic acid is preferred.

Also preferred are ethylenically unsaturated phosphoni acid monomers such as vinylphosphonic acid, allylphosphonic acid, vinylbenzylphosphonic acid, (meth)acrylamidoalkyl-phosphonic acids, acrylamidoalkyldiphosphonic acids, phosphonomethylated vinylamines, and (meth) acrylphosphonic acid derivatives.

Preferred base monomers include the ethylenically unsaturated base monomers containing a proton-accepting and or quaternizable nitrogen atom, preferably dialkylaminoalkyl acrylates , dialkylaminoalkyl methacrylates, dialkylaminoalkyl acrylamides and dialkylaminoalkyl methacrylamides. Particularly preferred are N,N-dimethylaminoethyl (meth)acrylate; and N,N-diethylaminoethyl (meth)acrylate and are preferably present in the amount of preferably about 25%, and more preferably about 30 weight % of monomers to about 80 weight %.

While an advantage of the instant invention is that the starting comonomer solution is self neutralizing and does not generally require a separate neutralization, the monoethylenically unsaturated, acid group-containing monomers and/or the base monomers may optionally be partially neutralised prior to or immediately following polymerization. The neutralisation of the acid groups may be carried out with alkali metal hydroxides, alkaline earth metal hydroxides, ammonia, as well as carbonates and bicarbonates. In addition any further base may be used that forms a water-soluble salt with the acid. A mixed neutralisation with various bases is also possible. When used, neutralisation of the acid groups with ammonia or with alkali metal hydroxides is preferred, and neutralisation with sodium hydroxide or with ammonia is particularly preferred. Neutralization of the basic groups may be accomplished with any inorganic or organic acid that forms a water-soluble salt with, or quaternizes the base monomer.

The polyamphoteric superabsorbent copolymer resulting from the radiation and/or curing of the monomer mixture will have CRC of greater than about 30 g/g, preferably, greater than about 40 g/g.

The term polyamphoteric, or amphoteric, superabsorbent copolymer means the superabsorbent copolymer contains both acidic and basic monomeric groups in the same polymer chain. This results in a SAP that generally does not require a neutralization agent to be added.

In addition the present invention includes a radiation curable coating composition made up of from about 20 weight % to about 80 weight % of polymerizerable acid monomer; and from about 20 weight % to about 80 weight of a polymerizable base monomer; and from 0 weight % to about 50 weight % of supplemental comonomer; and a cross linking agent; and a photoinitiator, and optionally functional additives. The coating compositions will preferably, contain a polymerizerable acid monomer selected from the group consisting of olefinically unsaturated carboxylic, phosphonic and sulfonic acid compounds; the polymerizable base monomer selected from the group consisting of ethylenically unsaturated base monomers containing a proton-accepting and or quaternizable nitrogen atom, preferably dialkylaminoalkyl acrylates , dialkylaminoalkyl methacrylates, dialkylaminoalkyl acrylamides and dialkylaminoalkyl methacrylamides. Particularly preferred are N,N-dimethylaminoethyl (meth)acrylate; and N,N-diethylaminoethyl (meth)acrylate. Furthermore, the coating composition may include an urethane oligomer, a methoxypolyethylene glycol methacrylate comonomer and/or other functional additives.

In preferred embodiments, the coating composition will have about 25 weight %, preferably, about 30 weight % to about 80 weight % of polymerizerable acid monomer and about 25 weight %, preferably about 30 weight % of to about 80 weight % of polymerizable base monomer and optionally from 0 weight % to about 50 weight % of a supplemental comonomer. After curing the coating composition it will have CRC of greater than about 30 g/g and less than about centrifuge about 10% extractables. Preferably, the cured coating composition will have a CRC of greater than about 40 g/g.

The coating composition may include a supplemental monomer that is reacted with the acid and base monomers, wherein the supplemental monomer is a monomer or oligomer which is hydrophilic or water soluble and include for example N-vinyl-2-pyridine, N-vinyl caprolactam, vinyl acetals, tetra-hydrofuryl acrylates, hydrophilic urethane acrylates, polyether acrylates, polyether methacrylate, polyester acrylates, polyester methacrylates and ethoxy-polyethylene glycols. Preferred are methoxypolyethylene glycol methacrylate comonomers. Such a product is available from LAPORTE PERFORMANCE CHEMICALS LIMITED under the trade name BISOMER MPEG350MA.

The present invention also includes a composite material comprising a substrate material and a coating composition made up of from about 20 weight % to about 80 weight % of a polymerizerable acid monomer; and from about 20 weight % to about 80 weight of a polymerizable base monomer; and from 0 weight % to about 50 weight % of supplemental comonomer; and a cross linking agent; and photoinitiator. Furthermore, the coating composition of the composite may include an urethane oligomer and a methoxypolyethylene glycol methacrylate supplemental comonomer or other functional additives. The coating composition in the composite after curing will have a CRC of greater than about 30 g/g and less than about centrifuge about 10% extractables. Preferred embodiments of the composite invention would included the embodiments of the coating composition as set forth above.

The present invention also includes a method for making a radiation curable coating composition. The method includes the steps of forming a monomer solution of about 20 weight % to about 80 weight % of polymerizerable acid monomer and from about 20 weight % to about 80 weight of a polymerizable base monomer and from 0 weight % to about 50 weight % of supplemental comonomers and a cross linking agent and a photoinitiator and optionally additives to improve film properties. Such additives may include, without limitation, thickeners, lubricants, coupling agents, stabilizers, waxes, release agents, inhibitors, wetting agents, antioxidants, pigments, inorganic salt, small amount of organic solvent, blowing or foaming agent, surfactant, adhesion promoter or tactifying agent, filler, fiber and antistatic agents. The monomer solution is subjected to radiation source for sufficient time to convert the monomer solution into a polyamphoteric superabsorbent copolymer. Preferably, the coating composition after curing will have a CRC of greater than about 40 g/g. The monomer coating composition is applied to a substrate prior to subjecting the coating composition to the radiation source.

Preferred embodiments of the method include elements of the preferred embodiments for the polyamphoteric superabsorbent copolymer set forth above. The first step in the preparation of the polyamphoteric superabsorbent copolymer includes the step of making a coating solution of acid and base monomers, cross linkers, photoiniator(s) and optionally supplemental comonomers and functional additives.

Suitable cross linking agents that may be used in making the coating compositions according to the invention are compounds that contain at least two ethylenically unsaturated groups within a molecule (class I cross linking agents), compounds that contain at least two functional groups that may react with functional groups of the monomers in a condensation reaction, in an addition reaction or in a ring-opening reaction (class II cross linking agents), compounds that contain at least one ethylenically unsaturated group and at least one functional group that can react with functional groups of the monomers in a condensation reaction, in an addition reaction or in a ring-opening reaction (class III cross linking agents), or polyvalent metal cations (class IV cross linking agents), and mixtures thereof. Among these, water-soluble cross linking agents are preferred. In this connection a cross linking of the polymers by the free-radical polymerisation of the ethylenically unsaturated groups of the cross linking molecule with the monoethylenically unsaturated monomers or is achieved by the compounds of the class I cross linking agents, whereas with the compounds of the class II cross linking agents and the polyvalent metal cations of the class IV cross linking agents, a cross linking of the polymers is achieved by a condensation reaction of the functional groups (class II cross linking agents) and/or by electrostatic interaction of the polyvalent metal cation (class IV cross linking agents) with the functional groups of the monomers. With the compounds of the class III cross linking agents a cross linking of the polymer is accordingly achieved both by free-radical polymerisation of the ethylenically unsaturated group as well as by a condensation reaction between the functional group of the cross linking agent and the functional groups of the monomers. It is often advantageous to include a combination of two or more of the above described cross linkers in the curable coating composition of the instant invention. A preferred cross linking agent is SARTOMER 454, which is an ethyloxylated (3) trimethylolpropane triacrylate (available from SARTOMER Company). A photoinitiator is required for a fast UV cure but may be omitted for certain types of radiation curing such as, for example, electron beam or thermal curing. Conventional photoinitiators can be used. Examples include benzophenones, acetophenone derivatives such as alpha hydroxyalkylphenylketones, benzoin alkyl ethers and benzil ketals, monoacylphosphine oxides and bisacylphosphine oxides. Thermal or other radical-type initiators may also be added. It is often advantageous to include two or more initiators of the above classes in the curable coating composition according to the invention.

Preferred photoinitiators include ESACURE KIP-100F (available from SARTOMER Company).

The amount of photoinitiator system is not particularly limited but will be effective to provide fast cure speed, ready processability, reasonable cost, good surface and through cure and lack of yellowing upon aging. Typical amounts can be, for example, about 0.3 wt % to about 10 weight % and, preferably about 1 wt % to about 5 wt %.

A radiation source is preferably used to convert the monomer coating composition into a polyamphoteric SAP. The radiation may be selected from the group consisting of infrared rays, visible rays, ultraviolet rays, x-rays, gamma rays, beta particles, high-energy electrons, heat or combinations thereof. Appropriate sources of radiation are commercially available. The radiation source in concert with the initiators previously described accomplishes both polymerization and cross linking of the coating composition, a key advantage over typical coating systems which only accomplish cross linking. Ultraviolet ("UV") rays are the preferable source to supply energy for this conversion.

The coating composition may include additional film forming additives including, without limitation, thickeners, lubricants, coupling agents, stabilizers, waxes, release agents, inhibitors, wetting agents, antioxidants, pigments, inorganic salt, small amounts of organic solvent, blowing or foaming agents, surfactants, adhesion promoters or tactifying agents, fillers, fibers and antistatic agents. Preferred are urethane oligomers.

The radiation curable coating composition, is made by first preparing a monomer-containing coating composition under non-polymerizing conditions. The monomers are mixed into a solution along with the cross linking agent(s), photoinitiator(s) and, optionally, additives to improve film properties of the coating composition. The composition is mixed at a low temperature, preferably below about 40° C.

Prior to subjecting the coating composition to radiation, the coating composition is applied, such as by painting, rolling, printing (i.e. dot printing), spraying, brushing, swabbing, or dip coating, onto a substrate to form an application of the coating composition on the substrate, followed by radiation conversion step into an SAP, in this case a polyamphoteric SAP. After the radiation conversion step, the resultant is a composite of the substrate coated with the SAP. Such substrates include cables, in particular optical cables. It can also be used in such applications selected from the group consisting of water-block tape, fibers, webs, nonwovens, hygiene applications, polymeric films and labels.

The coating compositions of the present invention have been found to have a superior fluid retention after curing to form a polyamphoteric superabsorbent copolymer and in particular some compositions after curing have a CRC of greater than about 30 g/g, preferably greater than about 40 g/g, and less than 10% extractables. Furthermore, depending on the desired end use (i.e., the particular kind of substrate onto which the coating composition is applied and then radiated), the SAP may have a water-soluble polymeric component. The content may range up to about 30% by weight of a component that includes, but is not limited to saponified polyvinyl alcohol, polyvinyl pyrrolidone, starch, starch derivatives, polyglycols, polyacrylic acids and combinations thereof. The molecular weight of the component is not critical, provided that it is water-soluble. Preferred water-soluble polymeric components are starch, polyvinyl alcohol and mixtures thereof. Preferably, the content of the water soluble polymeric component in the polyamphoteric SAP mixture ranges from about 1 to about 5% by weight, especially, if starch and/or polyvinyl alcohol are present as the water soluble polymeric component. Also, the water-soluble polymeric component may be present as a graft polymer.

To characterize the SAPs as set out in the Laboratory Examples below the centrifuge retention capacity (CRC) was measured in the following manner.

CRC Test. The test was conducted at ambient conditions of room temperature. Retention of deionized water was determined according to the tea bag test method and reported as an average value of 2 measurements. Approximately 100 mg of SAP particles, that had been sieved to a particle size distribution ranging from about 300 to 600 micrometers, were enclosed in a tea bag and immersed in the deionized for 30 minutes. Next, the tea bag was centrifuged at 1600 rpm for 3 minutes and weighed. The diameter of the centrifuge apparatus was about 20 cm. Also, 2 tea bags without particles were used as blanks.

The specific procedure is as follows:

1. Cut the teabag stock into 3×5-inch rectangles. Fold the strips in half, and seal two of the three open sides so the inside edge of the seals are about ¼ inch from the edge of the teabag.
2. For each determination, weigh 0.200+/−0.005 grams of modified cellulosic material into a teabag. Record the initial weight as $W_1$.
3. Seal the open side of the teabags using the heat sealer. Store the teabags in a desiccator if the period of time between the initial weighing and the determination is greater than 30 minutes.
4. Prepare the two test method blanks by heat-treating two empty teabags without cellulose material sample.
5. Fill a dish with deionized water to approximately 4 cm high.
6. Prepare the sealed teabags for immersion by gently shaking the sample to distribute the cellulosic material evenly across the teabag.
7. Immerse the teabags in the deionized water.
8. After 30 minutes, remove the teabags from the test liquid.
9. Individually hang each teabag up by the corners to drip-dry for 10 minutes.
10. Place the teabags into the centrifuge making sure to balance the centrifuge with proper teabag placement. Centrifuge for 3 minutes at 1600 rpm.
11. After centrifugation, determine the weights of each sample. Record the weights of the test blanks, without test sample (W2) and the weight of the teabag with test sample accurate to $0.01(W_3)$.

Then, the CRC property (measured in grams of liquid absorbed per gram of particles) was calculated according to the following equation.

$$CRC=(W_3-W_2-W_1)/W_1$$

where:

CRC=retention after 30 minutes immersion time (g/g)

$W_1$=initial weight in grams of SAP particles $W_2$=average weight in grams of two blanks after centrifugation $W_3$=weight in grams of test tea bag after centrifugation

EXAMPLES

Example 1

TABLE 1

Coating composition of the disclosed polyamphoteric superabsorbent copolymer

| Component | Percent (by wt) |
|---|---|
| Acrylic acid, Glacial | 34 |
| N,N-dimethylaminoethyl methacrylate | 52.28 |
| Urethane Oligomer | 4 |
| ESACURE KIP-100F | 1 |
| BISOMER | 3 |
| Pluronic 104 | 1.5 |
| 2-hydroxyethyl acrylate | 4 |
| SARTOMER 454 | 0.1 |
| 1,6-Hexanediol diacrylate | 0.12 |
| Total | 100 |

| | |
|---|---|
| Viscosity of UV solution: | 850 cps at 20 degree C. |
| Curing speed: | 200–300 meter/min. |
| Coating Thickness: | 75 micro meter |
| Clarity: | Clear |
| Color: | Colorless |

CRC result of the above sample

| Dry sample weight (g) | Soaking Time (min.) | Swollen sample weight (g) | CRC (g/g) |
|---|---|---|---|
| 0.2 | 5 | 8.4 | 38 |
| 0.2 | 10 | 10.8 | 50 |

TABLE 1-continued

| Coating composition of the disclosed polyamphoteric superabsorbent copolymer | | | |
|---|---|---|---|
| 0.2 | 30 | 12.4 | 58 |
| 0.2 | 60 | 13.8 | 65 |

Example 2

TABLE 2

Coating composition of the disclosed polyamphoteric superabsorbent copolymer

| Component | Percent (by wt) |
|---|---|
| Acrylic acid, Glacial | 35 |
| N,N-dimethylaminoethyl acrylate | 7 |
| N,N-dimethylaminoethyl methacrylate | 40.75 |
| Urethane Oligomer | 8 |
| ESACURE KIP-100F | 1 |
| BISOMER | 6 |
| Poly(ethylene glycol) acrylate | 1 |
| 1,6-Hexanediol diacrylate | 0.15 |
| SARTOMER 454 | 0.1 |
| Pluronic 105 | 1.0 |
| Total | 100 |

| | |
|---|---|
| Viscosity of UV solution: | 1250 cps at 20 degree C. |
| Curing speed: | 200–300 meter/min. |
| Coating Thickness: | 50 micro meter |
| Clarity: | Clear |
| Color: | Colorless |

CRC result of the above sample

| Dry sample weight (g) | Soaking Time (min.) | Swollen sample weight (g) | CRC (g/g) |
|---|---|---|---|
| 0.2 | 5 | 7.6 | 34 |
| 0.2 | 10 | 10.2 | 47 |
| 0.2 | 30 | 13.7 | 64.5 |
| 0.2 | 60 | 14.9 | 70.5 |

Example 3

TABLE 3

Coating composition of the disclosed polyamphoteric superabsorbent copolymer

| Component | Percent (by wt) |
|---|---|
| Acrylic acid, Glacial | 35 |
| N,N-dimethylaminoethyl acrylate | 40 |
| N,N-dimethylaminoethyl methacrylate | 9.78 |
| Urethane Oligomer | 6 |
| ESACURE KIP-100F | 1 |
| BISOMER | 6 |
| Poly(ethylene glycol) acrylate | 1 |
| 1,6-Hexanediol diacrylate | 0.12 |
| SARTOMER 454 | 0.1 |
| Pluronic 105 | 1.0 |
| Total | 100 |

| | |
|---|---|
| Viscosity of UV solution: | 1050 cps at 20 degree C. |
| Curing speed: | 200–300 meter/min. |
| Coating Thickness: | 50 micro meter |
| Clarity: | Clear |
| Color: | Yellow |

TABLE 3-continued

Coating composition of the disclosed polyamphoteric superabsorbent copolymer

CRC result of the above sample

| Dry sample weight (g) | Soaking Time (min.) | Swollen sample weight (g) | CRC (g/g) |
|---|---|---|---|
| 0.2 | 5 | 7.2 | 32 |
| 0.2 | 10 | 9.6 | 44 |
| 0.2 | 30 | 12.4 | 57 |
| 0.2 | 60 | 13.6 | 64 |

Example 4

TABLE 4

Coating composition of the disclosed polyamphoteric superabsorbent copolymer

| Component | Percent (by wt) |
|---|---|
| Acrylic acid, Glacial | 36 |
| N,N-dimethylaminoethyl acrylate | 53.25 |
| Urethane Oligomer | 4 |
| ESACURE KIP-100F | 1 |
| BISOMER | 3 |
| Poly(ethylene glycol) acrylate | 1.5 |
| 1,6-Hexanediol diacrylate | 0.15 |
| SARTOMER 454 | 0.1 |
| Pluronic 105 | 1.0 |
| Total | 100 |

| | |
|---|---|
| Viscosity of UV solution: | 950 cps at 20 degree C. |
| Curing speed: | 200–300 meter/min. |
| Coating Thickness: | 50 micro meter |
| Clarity: | Clear |
| Color: | Yellow |

CRC result of the above sample

| Dry sample weight (g) | Soaking Time (min.) | Swollen sample weight (g) | CRC (g/g) |
|---|---|---|---|
| 0.2 | 5 | 7.5 | 33.5 |
| 0.2 | 10 | 9.2 | 42 |
| 0.2 | 30 | 11.7 | 54.5 |
| 0.2 | 60 | 13.4 | 63 |

It will be understood that various details of the invention may be changed without departing from the scope of the invention. Furthermore, the foregoing description is for the purpose of illustration only, and not for the purpose of limitation of the invention being defined by the claims.

What is claimed is:

1. A non aqueous polyamphoteric superabsorbent copolymer composition comprising of:

(a) from about 20 weight % to about 80 weight % of polymerizerable acid monomer;

(b) from about 20 weight % to about 80 weight of a polymerizable base monomer that is an acrylate or methacrylate amine-containing monomer;

(c) a crosslinking agent;

(d) photoinitiator; and (e) a film-forming additive.

2. The polyamphoteric superabsorbent copolymer composition of claim 1 wherein the polymerizable acid monomer is selected from the group consisting of acrylic acid, methacrylic acid, ethacrylic acid, .alpha.-chloroacrylic acid, .alpha.-cyanoacrylic acid, .beta.-methacrylic acid (crotonic acid), .alpha.-phenylacrylic acid, .beta.-acryloxypropioni- c acid, sorbic acid, .alpha.-chlorosorbic acid, 2'-methylisocrotonic acid, cinnamic acid, p-chloro-cinnamic acid, .beta.-stearyl acid, itaconic acid, citraconic acid, mesaconic acid, glutaconic acid, aconitic acid, maleic acid, fumaric acid, tricarboxyethylene and maleic anhydride.

3. The polyamphoteric superabsorbent copolymer composition of claim 1 wherein the film forming additive is urethane oligomer.

4. The polyamphoteric superabsorbent copolymer composition of claim 3 wherein the (meth)acrylate amine containing base monomer is selected from the group consisting of N,N-dimethylaminoethyl methacrylate; N,N-diethylaminoethyl methacrylate; N,N-dimethylaminoethyl acrylate and N,N-diethylaminoethyl acrylate.

5. The polyamphoteric superabsorbent copolymer composition of claim 1 wherein the polymerizable acid monomer is selected from the group consisting of olefinically unsaturated carboxylic, phosphonic and sulfonic acid compounds.

6. The polyamphoteric superabsorbent copolymer composition of claim 1 having a CRC, in deionized water, of greater than about 30 g/g when the copolymer is cured.

7. A radiation curable non aqueous coating composition comprising a monomer solution comprising the nonaqueous reaction product of:

(a) from about 20 weight % to about 80 weight % of polymerizerable acid monomer and;

(b) from about 20 weight % to about 80 weight of polymerizable base monomer that is an acrylate or methacrylate amine-containing base monomer; and (c) from 0 weight % to about 50 weight % of supplemental monomer;

(d) a cross linking agent;

(e) a photoinitiator; and (f) a film forming additive wherein when the monomer solution is applied to a substrate, the monomer solution is polyermized and crosslinked in one step to form a water swellable coating composition on said substrate.

8. The radiation curable coating composition of claim 7 wherein the polymerizable acid monomer is selected from the group consisting of olefinically unsaturated carboxylic, phosphonic and sulfonic acid compounds.

9. The radiation curable coating composition of claim 7 wherein the polymerizable base monomer is selected from the group consisting of N,N-dimethylaminoethyl methacrylate; N,N-diethylaminoethyl methacrylate; N,N-dimethylaminoethyl acrylate and N,N-diethylaminoethyl acrylate.

10. The coating composition of claim 7 wherein the film forming additive is urethane oligomer.

11. The radiation curable coating composition of claim 7 having a CRC of greater than about 30 g/g and less than about 10% extractables after curing.

12. A composite material comprising a substrate material and a non aqueous coating composition comprising the nonaqueous reaction product of:

(a) from about 20 weight % to about 80 weight % of polymerizerable acid monomer;

(b) from about 20 weight % to about 80 weight of polymerizable base monomer that is an acrylate or methacrylate amine-containing monomer;

(c) from 0 weight % to about 50 weight % of supplemental monomer;

(d) cross linking agent;

(e) photoinitiator; and (f) a film-forming additive wherein when the coating composition is applied to a substrate the monomer solution is polyermized and crosslinked in one step to form a water swellable coating composition.

13. The composite material of claim 12 where the coating composition is exposed to radiation to form a polyamphoteric superabsorbent polymer.

14. The composite material of claim 12 wherein the coating composition comprises a polymerizable acid monomer is selected from the group consisting of olefinically unsaturated carboxylic, phosphonic and sulfonic acid compounds.

15. The composite material of claim 12 wherein the coating composition comprises a polymerizable base monomer is selected from the group consisting of N,N-dimethylaminoethyl methacrylate; N,N-diethylaminoethyl methacrylate; N,N-dimethylaminoethyl acrylate and N,N-diethylaminoethyl acrylate.

16. The composite material of claim 12 wherein the film forming additive is urethane oligomer.

17. The composite material of claim 12, wherein the coating composition has a CRC, in deionized water, of greater than about 30 g/g and less than about 10% extractables after curing.

18. The method for making a radiation curable coating composition, said method comprising of:

a) prepare a monomer solution comprising (i) from about 20 weight % to about 80 weight % of polymerizerable acid monomer and;

(ii) from about 20 weight % to about 80 weight of a polymerizable base monomer selected from the group consisting of N,N-dimethylaminoethyl methacrylate; N,N-diethylaminoethyl methacrylate; N,N-dimethylaminoethyl acrylate and N,N-diethylaminoethyl acrylate; and (iii) from 0 weight % to about 50 weight % of supplemental monomer; and (iv) cross linking agent;

(v) photoinitiator; and (vi) additives to improve film properties;

(b) subject the composition to a reaction in the absence of water; and (c) subject the coating composition to a radiation source for sufficient time to make a polyamphoteric superabsorbent copolymer.

19. The method for making a radiation curable coating composition of claim 18 wherein the monomer solution is applied to a substrate prior to subjecting the coating composition to a radiation source.

20. The method for making a radiation curable coating composition of claim 18 wherein the polymerizable acid monomer is selected from the group consisting of olefinically unsaturated carboxylic, phosphonic and sulfonic acid compounds.

21. The method for making a radiation curable coating composition of claim 18 wherein the additives to improve film properties is urethane oligomer.

22. Applications selected from the group consisting essentially of cable, water block tape, hygiene applications, nonwovens, fibers and labels containing a non aqueous coating composition comprising the nonaqueous reaction product of:

(i) from about 20 weight % to about 80 weight % of polymerizerable acid monomer;

(ii) from about 20 weight % to about 80 weight of a polymerizable base monomer selected from the group consisting of N,N-dimethylaminoethyl methacrylate; N,N-diethylaminoethyl methacrylate; N,N-dimethylaminoethyl acrylate and N,N-diethylaminoethyl acrylate; and (iii) from 0 weight % to about 50 weight % of supplemental monomer (iv) a cross linking agent;

(v) a photoinitiator; and (vi) additives to improve film properties.

23. The application of claim 22 where the coating composition is exposed to radiation to form a polyamphoteric superabsorbent copolymer.

24. A coated optical fiber comprising an optical fiber; and at least one coating on the optical fiber comprising non aqueous polyamphoteric superabsorbent copolymer composition comprising the radiation-cured nonaqueous reaction product of:

(i) from about 20 weight % to about 80 weight % of polymerizable acid monomer;

(ii) from about 20 weight % to about 80 weight of a polymerizable base monomer selected from the group consisting of N,N-dimethylaminoethyl methacrylate; N,N-diethylaminoethyl methacrylate N,N-dimethylaminoethyl acrylate and N,N-diethylaminoethyl acrylate;

(iii) from 0 weight % to about 50 weight % of supplemental monomer;

(iv) a cross linking agent;

(v) a photoinitiator; and (vi) additives to improve film properties.

25. A coating composition comprising a polymeric superabsorbent copolymer composition consisting essentially of the nonaqueous reaction product of:

(a) from about 20 weight % to about 80 weight % of polymerizerable acid monomer selected from the group consisting of acrylic acid, methacrylic acid, ethacrylic acid, .alpha.-chloroacrylic acid, .alpha.-cyanoacrylic acid, .beta.-methacrylic acid (crotonic acid), .alpha.-phenylacrylic acid, .beta. -acryloxypropioni-c acid, sorbic acid, .alpha.-chlorosorbic acid, 2'-methylisocrotonic acid, cinnamic acid, p-chloro-cinnamic acid, .beta.-stearyl acid, itaconic acid, citraconic acid, mesaconic acid, glutaconic acid, aconitic acid, maleic acid, fumaric acid, tricarboxyethylene and maleic anhydride;

(b) from about 20 weight % to about 80 weight of a polymerizable (meth)acrylate amine base monomer selected from the group consisting of N,N-dimethylaminoethyl methacrylate; N,N-diethylaminoethyl methacrylate; N,N-dimethylaminoethyl acrylate and N,N-diethylaminoethyl acrylate;

(c) a crosslinking agent;

(d) photoinitiator; and (e) a film forming additive.

26. The polyamphoteric superabsorbent copolymer of claim 25 wherein the film forming additive is urethane oligomer.

27. The polyamphoteric superabsorbent copolymer of claim 1 wherein the reaction product comprises 100% active ingredients.

28. The polyamphoteric superabsorbent copolymer of claim 7 wherein the reaction product comprises 100% active ingredients.

29. The composite material of claim 12 wherein the coating composition comprises the reaction product of 100% active ingredients.

* * * * *